(12) United States Patent
Huels et al.

(10) Patent No.: US 6,417,810 B1
(45) Date of Patent: Jul. 9, 2002

(54) ANTENNA ARRANGEMENT IN MOTOR VEHICLES

(75) Inventors: Helmut Huels, Schwaikheim; Matthias Reinhardt, Winnenden; Markus Ruther, Ostfildern, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/585,400

(22) Filed: Jun. 2, 2000

(30) Foreign Application Priority Data

Jun. 2, 1999 (DE) .......................................... 199 25 127

(51) Int. Cl.$^7$ ................................................ H01Q 1/32
(52) U.S. Cl. ................ 343/713; 343/700 MS; 343/711; 343/712
(58) Field of Search .......................... 343/700 MS, 713, 343/848, 711, 712

(56) References Cited

U.S. PATENT DOCUMENTS 5,933,074 A * 8/1999 Settles et al. ............... 340/426
5,959,581 A * 9/1999 Fusinski ............... 343/700 MS
6,166,698 A * 12/2000 Turnbull et al. ............ 343/713

FOREIGN PATENT DOCUMENTS

| DE | 42 20 654 | 1/1993 |
| DE | WO 97 13 289 | 4/1997 |
| DE | 297 13 582 | 11/1997 |
| DE | 197 35 395 | 2/1998 |

OTHER PUBLICATIONS

Bashir, M. et al. Flache Kombiantenne für GSM und GPS. In: Funkschau, Feb., 1995, pp. 60–62.

* cited by examiner

Primary Examiner—Don Wong
Assistant Examiner—Shih-Chao Chen
(74) Attorney, Agent, or Firm—Crowell & Moring LLP

(57) ABSTRACT

An antenna arrangement in a motor vehicle, in particular, an antenna of a radio remotely controllable locking system. The antenna surface is preferably arranged in the region of a window opening of the vehicle, in particular in the windshield, with one surface edge facing a bodywork part. The bodywork part acts as a ground for the RF signals. The antenna arrangement is of simple construction and can advantageously be combined with other functional units.

20 Claims, 4 Drawing Sheets

ANTENNA ARRANGEMENT IN MOTOR VEHICLES

BACKGROUND AND SUMMARY OF THE INVENTION

This application claims the priority of German Application 19925127.4, filed Jun. 2, 1999, the disclosure of which is expressly incorporated by reference herein.

The invention relates to an antenna arrangement in motor vehicles. Antenna arrangements in motor vehicles are known for various operational purposes. For example, a combination antenna is known from Funkschau 2/95 [Radio show], pages 60–62, in which a first antenna is formed as an annular slot antenna for a mobile radio network, inserted in an insulating form between a bodywork cutout and a conductor surface in it, with a surface antenna for a satellite navigation system also being arranged on the conductor surface. Active rod antennas and windshield antennas with elongated conductor tracks along windowpane rims are also known, as is the use of line sections running along cable harnesses.

The present invention is based on the object of specifying a simple antenna arrangement which can be produced cost effectively and can be integrated in the vehicle structure.

The invention is distinguished by a compact antenna element in the form of a conductive antenna surface which is insulated from ground, which is a reference-ground for the radio-frequency signals. The compact element is positioned a short distance from this ground, with the preferably essentially planar antenna surface of the ground facing a surface edge, which is referred to in the following text as the active surface edge, but otherwise pointing away from the ground, and, in particular, with the surfaces not being opposite one another. The ground is preferably formed by a part of the vehicle bodywork.

The antenna surface can advantageously be applied as a thin conductive layer on a dielectric supporting surface, for example bonded on or deposited as a film. The antenna surface does not need to be strictly planar, so that a large choice of suitable surfaces is available on the vehicle.

The antenna surface is advantageously positioned in the region of the window openings of the vehicle bodywork, in particular in the rear window or preferably in the front window region. The windshield surface itself or, according to another advantageous embodiment, a dielectric housing part of a functional unit that is independent of the antenna arrangement, may be used, for example, as the dielectric support. The functional unit is, as a result, advantageously used without requiring an additional support for the antenna surface. If the antenna surface is arranged in the rim region of a windowpane surface, the antenna surface is advantageously covered by a sheet, with a position close to a further functional unit advantageously being chosen once again, and a common cover being provided for the antenna surface and the further functional unit.

According to a particularly advantageous embodiment, the further functional unit may be an optical rain sensor arranged in the upper region of the windscreen.

The arrangement of the antenna surface in the upper rim region of a window opening has the further advantage of particularly low screening and shadowing by conductive bodywork parts, so that this advantageously results in good accessibility from all sides by a portable radio transmitter, in particular a radio key for a locking system which can be remotely operated by radio.

The radio frequency receiver, which is connected to the antenna surface via a connecting lead, is advantageously arranged a short distance away from the antenna surface, as a result of which a short connecting lead may be used, which need not have specific radio-frequency characteristics in the same way, for example, as a coaxial lead. The receiver is preferably shorted on one side to ground for radio frequency, without making any direct electrical contact with this ground, for example by the receiver assembly being arranged a short distance away from the bodywork and being capacitively and/or inductively connected to the ground and to the reference-ground potential that is present on it. The position of the antenna surface in an upper region of a window opening is also particularly advantageous for this purpose, because the roof surface is particularly suitable for use as ground, and the receiver assembly can easily and inconspicuously be integrated in the inner lining of the roof surface and/or in an additional functional group, which is frequently present, under the vehicle roof in the vicinity of the front window, for example a ceiling light, a roof-mounted control unit, etc. The ground coupling of the receiver for RF signals may also be added to by coupling into a cable harness.

In one preferred embodiment, the antenna surface is arranged approximately at right angles, and with its active surface edge parallel to an essentially straight edge of a ground which is a short distance away, in particular a bodywork panel. The distance, or the minimum distance in the case of edges which are not straight or not parallel, between the active surface edge and the opposite edge of ground is preferably greater than 0.005 $\lambda$, in particular greater than 0.01 $\lambda$ and preferably less than 0.05 $\lambda$, in particular less than 0.025 $\lambda$, where $\lambda$ is the operating wavelength of the antenna arrangement. The size of the antenna surface in a direction parallel to the shortest connection between the active surface edge of the antenna surface and the opposite edge of ground is preferably greater than 0.02 $\lambda$, in particular greater than 0.04 $\lambda$ and preferably less than 0.2 $\lambda$, in particular less than 0.1 $\lambda$. In a direction at right angles to this, if the edges of the antenna surface and earth surface are parallel and opposite, that is to say in particular in a direction parallel to these edges, the applicable sizes for advantageous dimensions of the antenna surface are essentially the same as those for the direction described above. The ratio of the transverse dimensions of the antenna surface in the two directions is advantageously between 0.2 and 5.

The antenna arrangement is preferably used in a radio system having an operating wavelength between 0.2 m and 2 m. The antenna arrangement can be used particularly advantageously for a locking system which can be operated by radio and has a radio key as a portable transmitter.

In a first preferred embodiment, the antenna surface is formed as a continuous, uniform, conductive surface. However, this function is maintained even if the surface is interrupted, for example being in the form of a grid, provided the width of the openings is very small in comparison with the operating wavelength. The antenna surface may also be structured in some other way, for example in spiral form or in the form of separate strips parallel to the edge, provided the distances between separate sections is very short in a direction parallel to the shortest connection of the active surface edge and the opposite edge of the earth surface, and the antenna impedance is not unacceptably adversely affected. In some circumstances, the antenna surface may be structured in order to adjust the impedance.

Another particularly advantageous measure for setting a desired impedance, in particular for impedance matching between the antenna surface and the receiver input, provides for reactive elements to be inserted between the antenna surface and the receiver input, in order to influence the impedance. According to one preferred embodiment for this purpose, such reactive elements are in the form of conductive surface structures between the antenna surface and the connecting lead to the receiver.

The connecting lead is advantageously connected into a section which is offset with respect to the centre of the surface element in the direction of the ground, preferably close to the active surface edge, and possibly with the interposition of the aforementioned surface structures of the reactive elements.

The length of the connecting lead is advantageously short in comparison with the operating wavelength, and is preferably shorter than 0.5 λ, in particular shorter than 0.25 λ.

Other objects, advantages and novel features of the present invention will become apparent from the following detailed description of the invention when considered in conjunction with the accompanying drawings.

BRIEF DESCRIPTION OF THE DRAWINGS

The invention will be described in more detail in the following text using preferred exemplary embodiments and with reference to the figures, in which.

DETAILED DESCRIPTION OF THE PREFERRED EMBODIMENT

Figure 1:
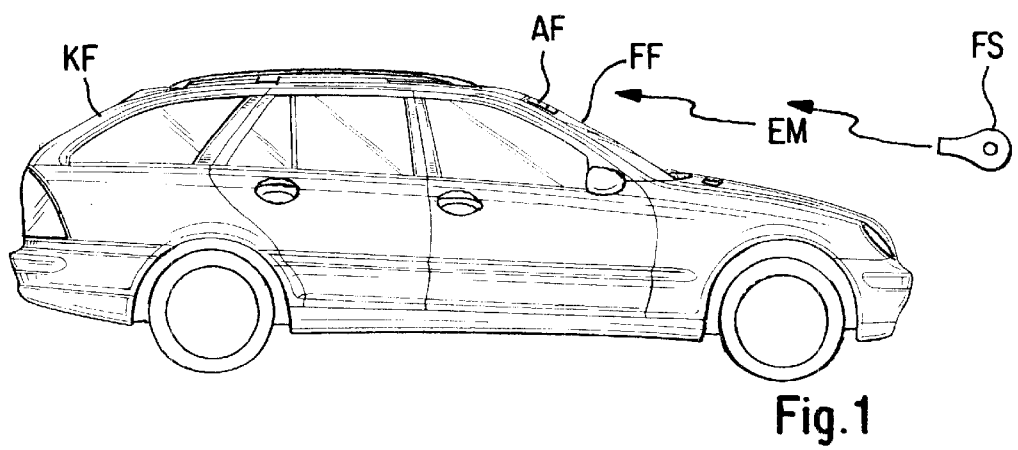
FIG. 1 shows a vehicle with the antenna surface in a preferred position.

FIG. 1 shows the preferred operational use of an antenna arrangement according to the invention, in a radio remotely controllable locking system for a motor vehicle KF. A vehicle key (radio key) FS is used as the portable transmitter for such intrinsically conventional systems. The key has an integrated low-power transmitter, which can be activated via an operating element and is fed from an also included battery. Generally, a radio range in the order of magnitude of 10 m is sufficient for such radio locking systems. Typically, the transmitter is activated at even shorter distances from the vehicle. The electromagnetic RF field EM of the radio key is received by an antenna arrangement on the vehicle, is demodulated in a receiver arrangement, and is converted into control signals to operate the locking system. The antenna surface AF provided for the vehicle antenna arrangement is preferably positioned in the upper rim region of the windshield FF, as shown in FIG. 1.

Figure 2:
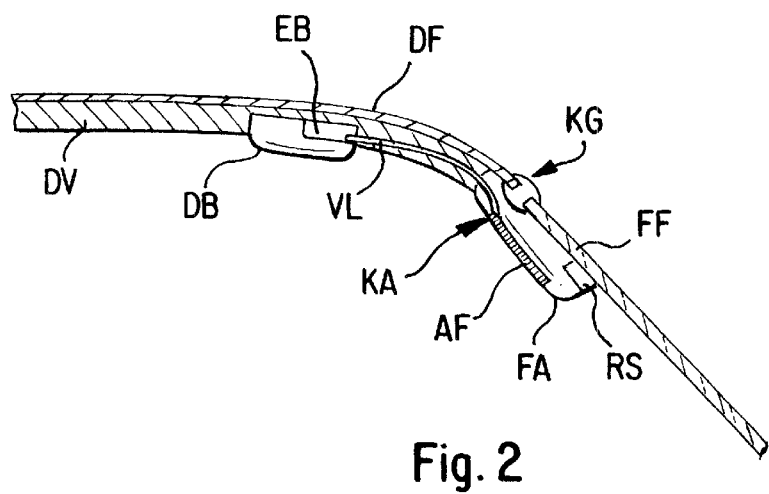
FIG. 2 shows a particularly advantageous antenna arrangement.

FIG. 2 shows a detail of a particularly advantageous arrangement, in which the antenna surface AF of the antenna arrangement is fitted to the inner surface of the cover FA of a functional unit which is in principle independent of the radio locking system, for example of a rain sensor RS, for example being bonded on as a metallic or metal-coated sheet, or being deposited as a metallic coating.

The receiver EB is connected to the antenna surface AF via a connecting lead VL of one polarity, which may be in the form of a single-core lead, for example a flexible braided lead. The opposite polarity for the RF antenna signals is advantageously provided by the receiver being opposite and at a short distance from the metallic roof surface DF, which acts as the ground for the antenna arrangement. Capacitive and/or inductive interaction results in close coupling between the receiver EB and the ground DF. This means that there is no need for any additional direct electrical earth connection to the ground. Generally, the ground connection via the vehicle cable harness is not RF-compatible.

The receiver assembly can be recess-mounted in the roof lining DV, within which the connecting lead VL is also routed and can, in particular, advantageously be physically combined with other assemblies such as a ceiling light, roof control unit DB, etc., so that the supply leads for the receiver assembly can also be routed together with the cable runs provided for the other assemblies.

Figure 3:
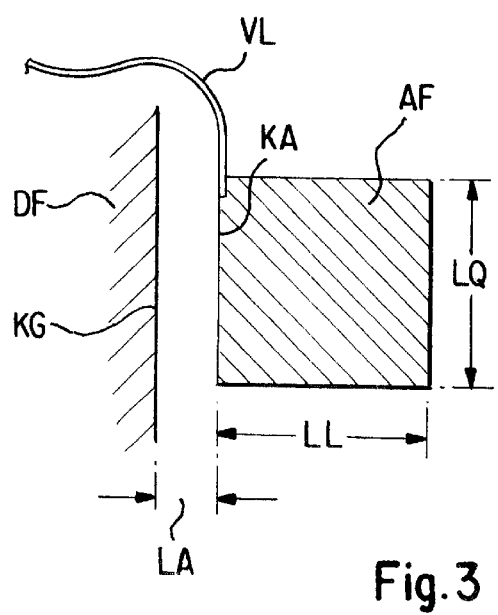
FIG. 3 shows a schematic sketch of preferred geometric relationships.

The active surface edge KA of the antenna surface AF which faces the roof surface used as the RF ground is at a short distance from the edge KG of the roof surface DF opposite it, in which case, for a radio locking system operating wavelength of about 1 m, this short distance is, for example, 1–2 cm, and is denoted by LA in the schematic sketch in FIG. 3. The rest of the profile in the antenna surface is routed at an obtuse angle, preferably approximately diametrically, away from ground.

The dimensions of the antenna surface are preferably chosen as a function of the operating wavelength in the manner already described and, for the example with an operating wavelength of λ=1 m, are, for example LL=5 cm in a direction parallel to the shortest connection between the active surface edge KA and the opposite edge KG, with LQ likewise being equal to 5 cm in the direction at right angles to LL. In the example sketched in FIG. 3, the antenna surface AF is at right angles to an active edge KA parallel to the straight opposite edge KG. Many different forms of discrepancy from this are possible, as already mentioned. In the sketched example, the connecting lead is connected to the antenna surface close to the active edge KA. A lead connection within the surface is also possible.

Figure 4A:
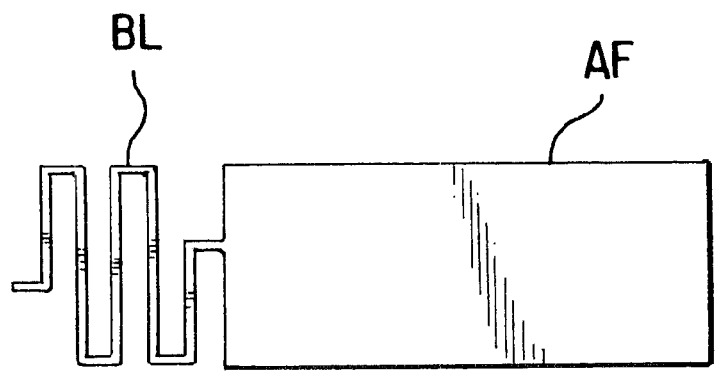
FIGS. 4A and 4B show antenna surfaces with reactive elements in the form of conductor surface structures.
Figure 4B:
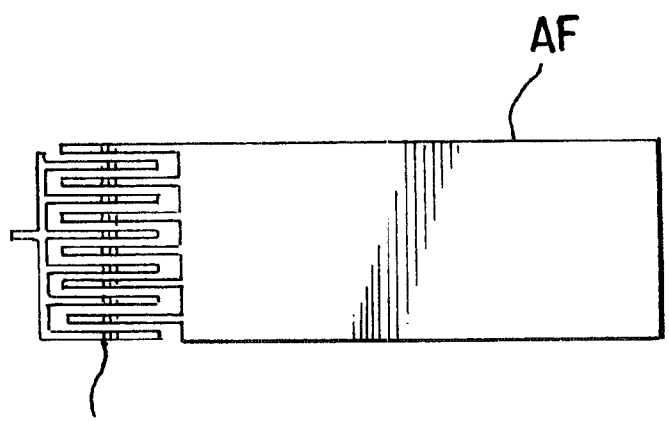

In the embodiments of antenna surfaces AF41 and AF42, respectively, sketched in FIGS. 4(A) and (B), the dimensions are chosen such that LL>LQ. Surface structures which act as reactive elements for the RF signals and in the form of an inductively acting wound lead BL (FIG. 4(A)) or a capacitively acting interdigital structure BC (FIG. 4(B)) are attached to the antenna surfaces, as an extension of the active edge KA. The reactive elements allow, in particular, impedance matching between the antenna arrangement and the receiver input.

Figure 5A:
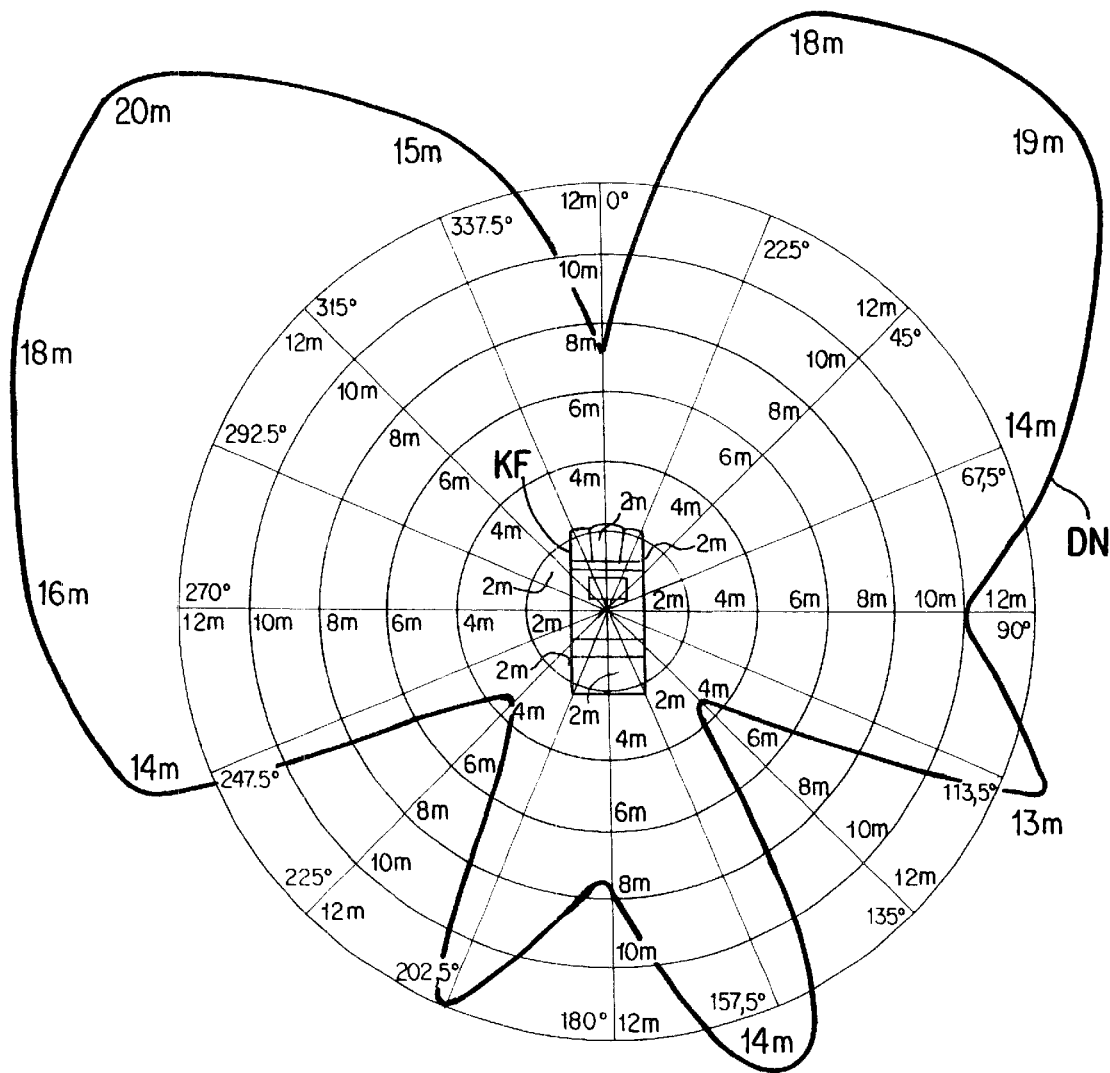
FIG. 5 shows polar diagrams for various antenna arrangements.

FIG. 5 (A) shows a polar diagram of an antenna arrangement constructed according to the invention for a radio remotely controllable locking system for a motor vehicle KF, which is also shown for illustrative comparison of the ranges achieved. The antenna surface is in this case arranged centrally in the upper rim region of the windshield on the dielectric housing of a rain sensor device, and is connected via a 25 cm-long, single-core connecting lead to the receiver, which is integrated in the ceiling light. Although the polar diagram shows major range fluctuations, the range always remains considerably more than 3 m, however.

Figure 5B:
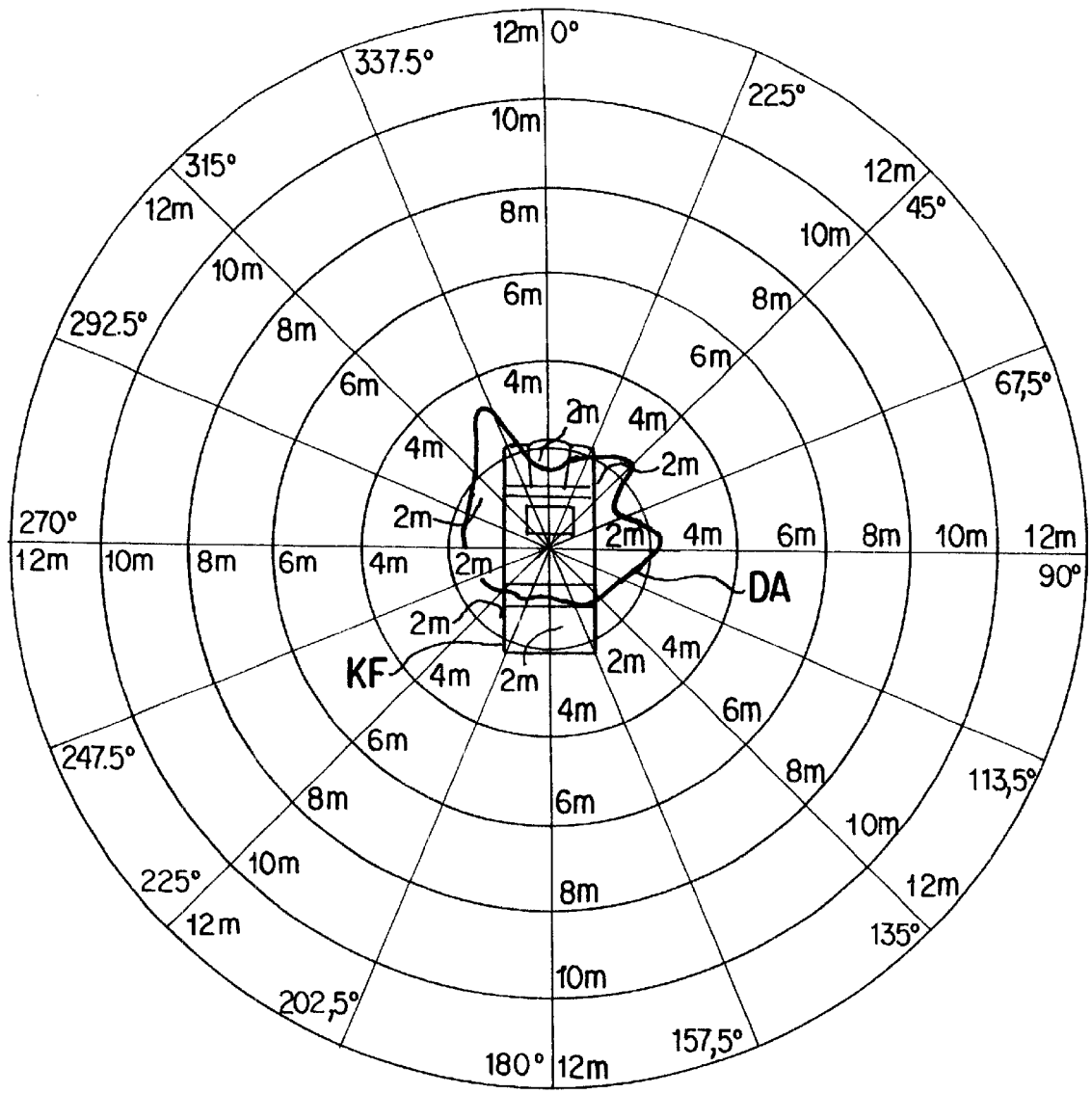

In comparison to this, FIG. 5(B) shows a polar diagram which was achieved for the same radio key transmission power with a cable harness antenna such as that normally used for motor vehicles, in which a braided cable incorporated in a cable loom of the vehicle cable harness is used as the antenna. The improvements are obvious, and are achieved despite the simple construction of the antenna according to the invention. In particular, it is thus also possible using the antenna arrangement according to the invention to manage with considerably reduced transmission powers, while maintaining conventional ranges.

The features specified above and in the claims can advantageously be implemented both individually and in various combinations. The invention is not limited to the described exemplary embodiments, but can be modified in any desired way within the framework of specialist knowledge.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An antenna system for a motor vehicle, said system comprising:

a receiver;

an electrically conductive antenna surface connected to said receiver by a supply lead wherein said conductive antenna surface has an active surface edge positioned to face a part of said motor vehicle functioning as a ground surface and wherein said conductive antenna surface is positioned at a given distance from said ground surface, wherein the receiver is arranged close to the ground surface and is coupled, with a low impedance, to the ground surface of one side for radio-frequency signals at an operating frequency of the antenna surface.

2. The antenna system according to claim 1, wherein in that the antenna surface is positioned in a rim region of a front window.

3. The antenna system according to claim 1, wherein the active surface edge of the antenna surface faces the vehicle roof as the ground surface.

4. The antenna system according to claim 1, further including a dielectric surface of a functional unit attached to the vehicle additionally used as a support for the antenna surface.

5. The antenna system according to claim 4, wherein the functional unit is a rain sensor arranged at the rim of a stationary window.

6. The antenna system according to claim 1, wherein the receiver is positioned a short distance away from the antenna surface.

7. The antenna system according to claim 6, wherein the length of the supply lead is shorter than half the operating wavelength of the antenna surface.

8. The antenna system according to claim 1, wherein the receiver supply lead is connected in a section of the antenna surface facing the ground surface.

9. The antenna system according to claim 8, wherein the receiver supply lead is connected to the antenna active edge of the antenna surface.

10. The antenna system according to claim 1, further comprising reactive elements inserted between the antenna surface and the receiver, for impedance matching.

11. The antenna system according to claim 10, wherein the reactive elements are inserted between the antenna surface and the receiver supply lead.

12. The antenna system according to claim 11, wherein the reactive elements are in the form of structured conductive surfaces.

13. The antenna system according to claim 12, wherein the reactive elements are formed on the same dielectric support as the antenna surface.

14. The antenna system according to claim 1, wherein the antenna surface is intrinsically structured with surface interruptions.

15. The antenna system according to claim 1, wherein a minimum distance between the active surface edge of the antenna surface and the ground surface is greater than 0.005 $\lambda$, and less than 0.05 $\lambda$, where $\lambda$ is the operating wavelength of the antenna arrangement.

16. The antenna system according to claim 1, wherein the ratio of the surface transverse dimensions of the antenna surface in two mutually perpendicular directions is between 0.25 and 4.

17. The structure according to claim 1, wherein said remote control device is a locking system, which can be operated by radio and has a radio key.

18. The antenna system according to claim 1, wherein the antenna surface is used at an operating wavelength between 0.2 m and 2 m.

19. The antenna system according to claim 15, wherein the minimum distance between the active surface edge of the antenna surface and the ground surface is greater than 0.01 $\lambda$ and less than 0.025 $\lambda$.

20. The antenna system according to claim 1, wherein an extent of said conductive antenna surface is in a direction away from said ground surface.

* * * * *